Patented Mar. 30, 1948

2,438,808

UNITED STATES PATENT OFFICE 2,438,808

2-CARBALKOXY-3-KETO-TETRAHYDRO-THIOPHENE PROCESS

Anthony William d'Aubigny Avison, Franz Bergel, and John Wynne Haworth, Welwyn Garden City, England, assignors, by mesne assignments, to Hoffmann-La Roche Inc., Nutley, N. J., a corporation of New Jersey No Drawing. Application December 18, 1943, Serial No. 514,861. In Great Britain December 22, 1942

2 Claims. (Cl. 260—329)

This invention relates to a process for the manufacture of heterocyclic sulphur compounds.

Cyclic β-ketonic esters have been described in the literature. Thus Dieckmann (Ann., 317, 27–109) describes, for example, the preparation of cyclopentanone-2-carboxylic acid ethyl ester from the action of sodium ethylate on the diethyl ester of adipic acid. Corresponding compounds containing a sulphur atom in place of one of the —CH$_2$— groups in the ring are, however, not known, although Hinsberg (Ber., 43, 901–906; 45, 2413 et seq.; Journ. Pr. Chem. (2), 84, 169–93) describes the preparation of compounds of the type

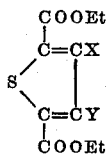

from the action of α-dicarbonyl compounds such as oxalic or pyruvic acid esters on thiodiglycollic acid dimethyl or diethyl ester.

Acording to the present invention substances of the general formula

I   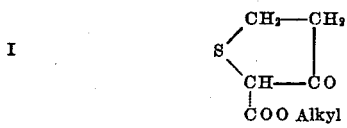

are manufactured by causing dibasic acid esters of the type R$_1$OOC.CH$_2$.S.CH$_2$.CH$_2$.COOR$_2$, where R$_1$ and R$_2$ are alkyl groups, to undergo ring closure with elimination of an alcohol R$_2$OH in the presence of alkaline condensing agents such as alkali metals and their derivatives, for example, sodium metal, sodamide, or sodium ethylate.

Although it would appear that the above ring-closure could also lead to the formation of isomeric compounds of the type II   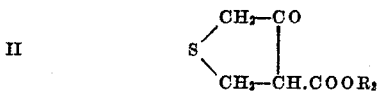

it is found that, in practice, only type I is isolated, irrespective of the nature of R$_1$ and R$_2$.

The cyclic β-ketonic esters prepared in this way are intermediates in the preparation of pharmaceutically useful compounds.

The following examples in which the quantities are expressed as parts by weight illustrate the manner in which the present invention may be carried into effect.

Example 1

9.8 parts of S-carbethoxyethyl-thioglycollic acid ethyl ester (obtained from S-carboxyethyl-thioglycollic acid, prepared as described by Loven, Ber., 29, 1140, by treatment with absolute ethyl alcohol and dry hydrogen chloride in the normal manner) are dissolved in 50 parts of benzene (previously dried with sodium) and treated with 1 part of powdered sodium metal. The reaction may begin at room temperature, but if necessary the reaction mixture is subjected to gentle heating on a waterbath. As a result of the reaction a yellow solid starts to separate. Gentle refluxing on the water bath for about an hour completes the reaction. The mixture is then cooled in ice and an ice cold 5% aqueous solution of sulphuric acid is added with shaking until the mixture is acid to congo. As soon as all the yellow solid sodium derivative has been decomposed with acid, the benzene layer is separated and washed with water, sodium bicarbonate solution and again with water. The benzene solution is dried over anhydrous sodium sulphate, the benzene is evaporated and the residue distilled under reduced pressure. 2 carbethoxy-3-keto-tetrahydrothiophene is obtained as a liquid, B. P. 131–132°/15 mm.

If desired, the powdered sodium used in the above example may be replaced by an equivalent quantity of freshly powdered sodamide, or the solvent may be dispensed with and the S-carbethoxyethyl-thioglycollic acid ethyl ester treated with the sodium in the form of wire and in the presence of a small quantity of ethyl alcohol.

Example 2

11 parts of S-carbmethoxyethyl-thioglycollic acid methylester (prepared in an analogous manner to the diethylester) are dissolved in 50 parts dry benzene and treated with 1.5 parts of powdered sodium exactly as described in the previous example. In this case, the 2-carbmethoxy-3-keto-tetrahydro-thiophene is obtained as a colourless liquid boiling at 121–124° C./15 mm.

Sodamide in benzene or sodium and alcohol may be used in this reaction in place of powdered sodium.

Example 3

26.2 parts of beta-chloropropionic acid ethyl ester dissolved in 25 parts of ethyl alcohol are heated on the water bath with occasional shaking with 17.7 parts of thioglycollic acid dissolved in 30 parts of water containing 15.4 parts of sodium hydroxide for 2 hours. The mixture is cooled and 10% aqueous sulphuric acid added until congo paper shows an acid reaction. The oil which precipitates is extracted with ether and the ethereal solution is dried with anhydrous sodium sulphate. The ether is evaporated and the residue treated with three times its volume of dry benzene which is also evaporated to assist in removal of moisture. The resulting dry residue is taken up in 100 parts of dry benzene and 19.2 parts of thionyl chloride is added. The mixture is heated at 50–70° C. for two hours, after which it darkens from yellow to red. Benzene and any unreacted thionyl chloride are removed by evaporation under reduced pressure. The dark residue is distilled under reduced pressure when S-carbethoxyethyl-thioglycollic acid chloride is obtained as a colourless liquid, B. P. 80–88°/0.1 mm.

4.8 parts of the acid chloride are treated with 5 parts of dry methanol with ice-cooling. The mixture is allowed to stand at room temperature for two hours and the excess methyl alcohol evaporated. Distillation of the residue under reduced pressure yields the methyl ester of S-carbethoxyethyl-thioglycollic acid as a liquid, B. Pt. 134–138°/15 mm.

27 parts of this ester are dissolved in 125 parts of dry benzene and treated with 4 parts of powdered sodium in the same way as before, when 2-carbmethoxy-3-keto-tetrahydrothiophene is obtained.

Example 4

16.2 parts of S-carbethoxymethyl-thiolpropionic acid methyl ester (prepared as described in the previous example using beta-chloropropionic acid methyl ester, and treating the acid chloride with ethyl alcohol) are dissolved in 75 parts of dry benzene and treated with 2 parts of powdered sodium in the manner described hitherto. The produce is 2-carbethoxy-3-keto-tetrahydrothiophene.

Example 5

The crude S-carbmethoxyethyl-thioglycollic acid chloride from 30.6 parts of beta-chloropropionic acid methyl ester and prepared in the manner described previously is treated with 60 parts of n-butanol in the cold. Distillation gives S-carbmethoxyethyl thioglycollic acid n-butyl ester B. Pt. 176–182°/15 mm. 30 parts of this ester are dissolved in 100 parts of dry benzene and treated with 3.5 parts of powdered sodium as before. The product is mainly the n-butylester of 2-carboxy-3-keto-tetrahydrothiophene B. Pt. ca. 145°/15 mm.

Example 6

25 parts of the n-butyl ester of S-carboxyethyl-thioglycollic acid methyl ester (obtained from S-carbmethoxymethyl)-thiolpropionic acid chloride and n-butanol in an analogous manner to the starting material of Example 5) are dissolved in 100 parts benzene and treated with 3 parts powdered sodium as before. The product is 2-carbmethoxy-3-keto-tetrahydrothiophene.

Example 7

6.6 parts of 2-carbmethoxymethyl-thiolpropionic acid iso-propyl ester (liquid B. Pt. 145–147°/15 mm. obtained by reacting beta-chloropropionic acid iso-propyl ester and thioglycollic acid, preparing the acid chloride of the product and treating this with methylalcohol following the methods outlined above) are dissolved in 30 cc. benzene and treated with powdered sodium as before. 2-carbmethoxy-3-keto-tetrahydrothiophene is obtained.

We claim:

1. A process for the manufacture of heterocyclic sulphur compounds of the general formula:

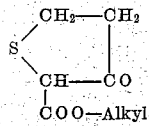

which comprises treating dibasic acid esters of the general formula:

where $R_1$ and $R_2$ are alkyl groups with an alkali metal to bring about ring closure with elimination of an alcohol $R_2OH$.

2. A process for the manufacture of heterocyclic sulphur compounds of the general formula:

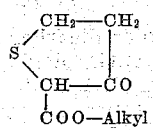

which comprises treating dibasic acid esters of the general formula

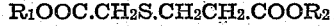

where $R_1$ and $R_2$ are alkyl groups with sodium to bring about ring closure with elimination of an alcohol $R_2OH$.

ANTHONY WILLIAM D'AUBIGNY AVISON.
FRANZ BERGEL.
JOHN WYNNE HAWORTH.